(12) United States Patent
Watanabe

(10) Patent No.: US 10,119,054 B2
(45) Date of Patent: Nov. 6, 2018

(54) FILLING MATERIAL, A SEALING STRUCTURE AND A METHOD OF MAKING THE SEALING STRUCTURE

(71) Applicant: Kayo Watanabe, Kyoto (JP)

(72) Inventor: Kayo Watanabe, Kyoto (JP)

( * ) Notice: Subject to any disclaimer, the term of this patent is extended or adjusted under 35 U.S.C. 154(b) by 550 days.

(21) Appl. No.: 14/651,330

(22) PCT Filed: Dec. 13, 2013

(86) PCT No.: PCT/JP2013/083465
§ 371 (c)(1),
(2) Date: Jun. 11, 2015

(87) PCT Pub. No.: WO2014/092182
PCT Pub. Date: Jun. 19, 2014

(65) Prior Publication Data
US 2015/0315440 A1     Nov. 5, 2015

(30) Foreign Application Priority Data

Dec. 13, 2012   (JP) ................. 2012-272700

(51) Int. Cl.
*F16J 9/00*     (2006.01)
*C09K 3/10*    (2006.01)
(Continued)

(52) U.S. Cl.
CPC ............ *C09K 3/1006* (2013.01); *B22D 45/00* (2013.01); *B22F 1/0062* (2013.01); *B22F 3/12* (2013.01);
(Continued)

(58) Field of Classification Search
CPC .......... C09K 3/1006; C09K 2200/0213; C09K 2200/06; B22D 45/00; B22F 1/0062;
(Continued)

(56) References Cited

U.S. PATENT DOCUMENTS 4,310,640 A * 1/1982 Kato ..................... C08K 3/22
525/100
4,618,653 A * 10/1986 Kawakubo .......... C08F 283/004
525/254
(Continued)

FOREIGN PATENT DOCUMENTS

CN         86104577 A      2/1987
CN        101511942 A      8/2009
(Continued)

OTHER PUBLICATIONS

Office Action issued in corresponding Chinese Patent Application No. 201380065292.0 dated Dec. 22, 2015.
(Continued)

*Primary Examiner* — Nathan Cumar
(74) *Attorney, Agent, or Firm* — Morgan, Lewis & Bockius LLP

(57) ABSTRACT

A liquid epoxy resin, a powdered metal and a hardening agent are provided as a filling material (S) and poured into an insert hole (82). The filling material (S) is in a liquid state under a normal temperature so as to make the filling material (S) handle easily in the filling work. The filling material (S) is hardened at a clearance between a bushing tool (12) and the insert hole (82). The filling material (S) is placed between the bushing tool (12) and the insert hole (82) to enhance a heat-conductivity therebetween. By heat treating a metallic mold die 80, it is possible to char the epoxy resin. This makes it possible to deposit the powdered metal (copper or the like) over an entire area of the clearance so as to highly enhance the heat-conductivity.

5 Claims, 6 Drawing Sheets

(51) Int. Cl.
*B22F 3/12* (2006.01)
*B22F 3/24* (2006.01)
*B22F 7/08* (2006.01)
*B22F 1/00* (2006.01)
*B22D 45/00* (2006.01)

(52) U.S. Cl.
CPC ............... *B22F 3/24* (2013.01); *B22F 7/08* (2013.01); *B22F 2001/0066* (2013.01); *B22F 2003/248* (2013.01); *C09K 2200/0213* (2013.01); *C09K 2200/06* (2013.01); *Y10T 16/063* (2015.01)

(58) Field of Classification Search
CPC ...... B22F 3/12; B22F 3/24; B22F 7/08; B22F 2003/248; B22F 2001/0066; Y10T 16/063; F16J 9/00; F16J 15/00
USPC ........................................................ 277/300
See application file for complete search history.

(56) References Cited

U.S. PATENT DOCUMENTS

| | | | | |
|---|---|---|---|---|
| 5,636,549 | A | * | 6/1997 | Devenyi ............... F16B 33/02 411/411 |
| 2005/0197440 | A1 | * | 9/2005 | Chen ..................... C09K 21/02 524/440 |
| 2006/0247355 | A1 | | 11/2006 | Kosaka et al. |
| 2010/0113667 | A1 | | 5/2010 | Morita et al. |

FOREIGN PATENT DOCUMENTS

| | | | |
|---|---|---|---|
| JP | 10-72266 | A | 3/1998 |
| JP | 11-279379 | A | 10/1999 |
| JP | 2005-248168 | A | 9/2005 |
| JP | 2006 289382 | * | 10/2006 |
| JP | 2006-289382 | A | 10/2006 |
| JP | 2006-328352 | A | 12/2006 |
| JP | 2008-063542 | A | 3/2008 |
| JP | 2009-074075 | A | 4/2009 |

OTHER PUBLICATIONS

International Search Report issued in corresponding International Patent Application No. PCT/JP2013/083465 dated Mar. 25, 2014.
Translation of the International Preliminary Report on Patentability in corresponding PCT/JP2013/083465 dated Jul. 9, 2015.
Japanese Office Action issued in corresponding Japanese Patent Application No. 2014-552099 dated Jun. 10, 2016.
Office Action issued in corresponding Chinese Patent Application No. 201380065292.0 dated Sep. 2, 2016.
Office Action issued in corresponding Korean Patent Application No. 10-2015-7018639 dated Oct. 18, 2016.

* cited by examiner

FILLING MATERIAL, A SEALING STRUCTURE AND A METHOD OF MAKING THE SEALING STRUCTURE

BACKGROUND OF THE INVENTION

Field of the Invention

The present invention relates to a filling material, a sealing structure and a method of making the sealing structure in which the filling material is provided into a clearance defined between a bushing tool and an insert hole formed on a device body.

In a first prior art reference (Japanese Laid-open Patent Application No. 2006-289382), disclosed is a metal die cooling structure and a method of making the metal die cooling structure in which a heat-conductive layer is provided between a casing inserted into a cooling hole and an inner wall of the cooling hole. The heat-conductive layer is filled with a molten metal (referred to as a filler metal hereinafter) having a low melting temperature.

More specific, a soldering material (alloyed metal having a low melting temperature) is provided between an outer surface of the casing and an inner surface of the cooling hole so as to obviate an air clearance therebetween. After the alloyed metal is cooled and solidified, the alloyed metal resultantly fixedly secures the casing within the cooling hole (refer to paragraph [0012]).

In a second prior art reference (Japanese Laid-open Patent Application No. 09-29416), disclosed is a molten-metal cooling pin used for a metal die in which an inner cylinder and an outer cylinder are provided in a double cylinder structure within a molten-metal cooling portion of the metal die.

More particularly, the molten-metal cooling pin forms a heat-transmitting member which is poured and solidified at a clearance between the inner cylinder and the outer cylinder (refer to e.g., claim 5).

A third prior art reference (Japanese Laid-open Patent Application No. 2011-104604) discloses a cooling unit which prevents a heat-transmitting member from flowing out, so as to avoid the cooling effect from reducing against a metallic mold die (refer to "Abstract" and "Problems to be Solved").

More specific, even when the thermo-grease (heat-transmitting member) is inserted into the cooling hole prior to inserting the bushing tool, it is possible to prevent the thermo-grease from flowing out of the cooling hole (refer to paragraph [0008]).

In the third prior art reference, it is possible to prevent the heat-transmitting member from flowing out of an outer surface to an inner surface of the bushing tool through a communicating member. This makes it possible to prevent a first seal member from moving toward an axial direction of the bushing tool off a circumferential groove. This secures a liquid-tightness by means of the first seal member to prevent the thermo-grease from flowing out of the cooling hole (refer to paragraph [0012]). It is to be noted that the thermo-grease serves as a heat-transmitting grease mixed with a powdered metal such as, for example, copper and aluminum.

In the first prior art reference in which the molten metal is poured into the cooling hole to improve the tight-fitting structure between the casing and the cooling hole, it requires a heating procedure which heats the metal die up to a temperature (e.g., 600° C.) more than the filler metal can melt when the filler metal is taken out of the metal die when exchanging the casings (refer to paragraph [0019]). Namely, it is necessary to implement the procedure to melt and solidify a proper quantity of the filler metal so as to obviate the air clearance, thereby making the procedure laborious and time-consuming (not user-friendly).

Upon implementing the maintenance of removing strains from the metal die, there would be a risk at the time of heating the filler metal that the filler metal will be molten to release the tight-fitting structure between the casing and the cooling hole. When the casing tightly engages against the inner wall of the cooling hole, there is a possibility of developing the die cracks and the casing being partly broken to resultantly lose the function of the internal lining.

The second prior art reference which represents the tight-fitting heat-conductive layer in the molten-metal cooling pin used for the metal die, has the same problems as mentioned in the first prior art reference.

In the third prior art reference, the metallic mold die rises the temperature more than the heat-resisting temperature of the thermo-grease when the metallic mold die is used to mass production. In this instance, it is supposed that the thermo-grease is molten to flow out for leakage or vaporized to abruptly inflate. It is to be noted that the thermo-grease generally has a heat-conductivity lower than that of the stainless steel and iron.

Therefore, the present invention has been made with the above drawbacks in mind, it is a main object of the invention to provide a filling material, a sealing structure and a method of making the sealing structure which is capable of enhancing a heat-conductivity of a bushing tool which is inserted into a cooling hole formed on a device body.

SUMMARY OF THE INVENTION

According to the present invention, there is provide a filling material in which a liquid epoxy resin, a powdered metal and a hardening agent in which the epoxy resin is hardened by the hardening agent, or the epoxy resin being charred by means of a heat treatment after hardened.

As a mixing ratio of the filling material, the powdered metal has 85-95% by weight and the epoxy resin has 15-5% by weight. The hardening agent (e.g., de-natured polyamine) may have 3-10% by weight against each of the filling material and the powdered metal.

The filling material contains a noncombustible agent for fear that the epoxy resin should not be hardened. As the noncombustible agent, prepared is a phosphorous-based substance or a halogen-based substance. The noncombustible agent may have 0.5-1.0% by weight against each of the epoxy resin and the powdered metal.

The filling material has the powdered metal such as, for example, copper or zinc, grain size of which is more than 1 μm in diameter. The powdered metal may have grain size more than 4-100 μm or 4-50 μm especially when the powdered metal is applied to the metallic mold die.

When the combustible powdered zinc is used, the powdered zinc is mixed within the epoxy resin to cover the powdered zinc with the epoxy resin so as to isolate the powdered zinc from oxygen in the atmosphere. The powdered metal may have two types of grain sizes (e.g., 40 μm and 4 μm).

The powdered metal may be one selected from a powdered stainless steel, powdered iron, powdered copper or powdered zinc. Otherwise, the powdered metal may be a powdery mixture appropriately combined among the powdered stainless steel, powdered iron, powdered copper and powdered zinc.

In a sealing structure, a bushing tool is inserted into a cooling hole provided on a device body. The bushing tool has an outer diameter corresponding to an inner diameter of the cooling hole. The filling material is provided and solidified between the bushing tool and the cooling hole, so as to produce the powdered metal with the epoxy resin charred through the heat treatment.

The device body categorically includes the metal die, an engine and the equivalents. The metal die categorically includes a molten-metal cooling pin (e.g., the outer cylinder in the prior art) which directly comes in contact with molten metal.

In a method of making a sealing structure in which a filling material is provided into a cooling hole defined on the device body, the filling material is provided into the cooling hole. Inserted is a bushing tool which has an outer diameter corresponding to an inner diameter of the cooling hole. The bushing tool is pushed into the cooling hole by a predetermined quantity and the epoxy resin is hardened to tightly attach the epoxy resin between the bushing tool and the cooling hole. After finishing the pushing step, a heat treatment step is further provided so that the device body is heat treated to char the epoxy resin.

A bushing tool has a leading end which has a semi-spherical end portion corresponding to the semi-spherical end portion of the insert hole which is defined on the device body. The bushing tool is inserted into the insert hole, and having an outer diameter identical to an inner diameter of the insert hole. The bushing tool forms a cylindrical configuration having a bottom-ended portion, and having an axial line which aligns along an axial line of the insert hole after the bushing tool is completely inserted into the insert hole.

As other aspect of the invention, a ultra-thin metallic wire is wound about an outer surface of the bushing tool in a spriral thread fashion with a predetermined pitch. The metallic wire acts as a spacer to keep a clearance uniform between the outer surface of the bushing tool and an inner surface of the cooling hole when the bushing tool is inserted into the cooling hole.

According to the present invention, the filling material is in a liquid state under a normal temperature so as to make the filling material handle easily in the filling procedure. With the favorable use of the de-natured polyamine as the hardening agent, it is possible to reduce the viscosity of the epoxy resin and harden the epoxy resin under the normal temperature. As the noncombustible agent, it is preferable to select the phosphorous-based agent which is free from any toxic component. The noncombustible agent makes the epoxy resin incombustible when the epoxy resin is not solidified.

Upon rendering the powdered metal (e.g., powdered copper or powdered zinc) to have the grain size more than 1 μm in diameter, it is possible to mix the powdered metal having two types of grain sizes (e.g., 40 μm and 4 μm). In this situation, the grains (4 μm) fill up the intergranular space of the grain size (40 μm).

In the sealing structure and the method of making the sealing structure, the filling material is provided so that the bushing tool pushes up the filling material (i.e., deaeration) to fill up the clearance between the bushing tool and the cooling hole, thereby preventing the air voids from occurring in the filling material so as to enhance the heat-conductivity therebetween.

With the powdered metal mixed with the hardened or charred epoxy resin, it is possible to completely plug the the clearance between the bushing tool and the cooling hole. This makes it possible to separate the bushing tool from the inner surface of the cooling hole. This means to make the bushing tool in contact with the inner surface of the cooling hole by way of the powdered metal mixed with the hardened or charred epoxy resin, thereby enhancing the heat-conductivity therebetween so as to readily adjust the temperature of the device body.

With the metallic wire provided to keep the clearance (sealing space) uniform between the outer surface of the bushing tool and an inner surface of the cooling hole when the bushing tool is inserted into the cooling hole, it is possible to equally transfer a cooling heat from the bushing tool to the device body (metallic mold die) through the filling material. Upon hardening the epoxy resin, the metallic wire comes in integral with the epoxy resin, while the metallic wire comes in integral with the charred epoxy resin upon heat treating the epoxy resin. This makes it possible for the metallic wire to contribute to the heat-conductivity between the bushing tool and the device body.

BRIEF DESCRIPTION OF THE DRAWINGS

A preferred form of the present invention are illustrated in the accompanying drawings in which.

DETAILED DESCRIPTION OF PREFERRED EMBODIMENTS

Figure 1:
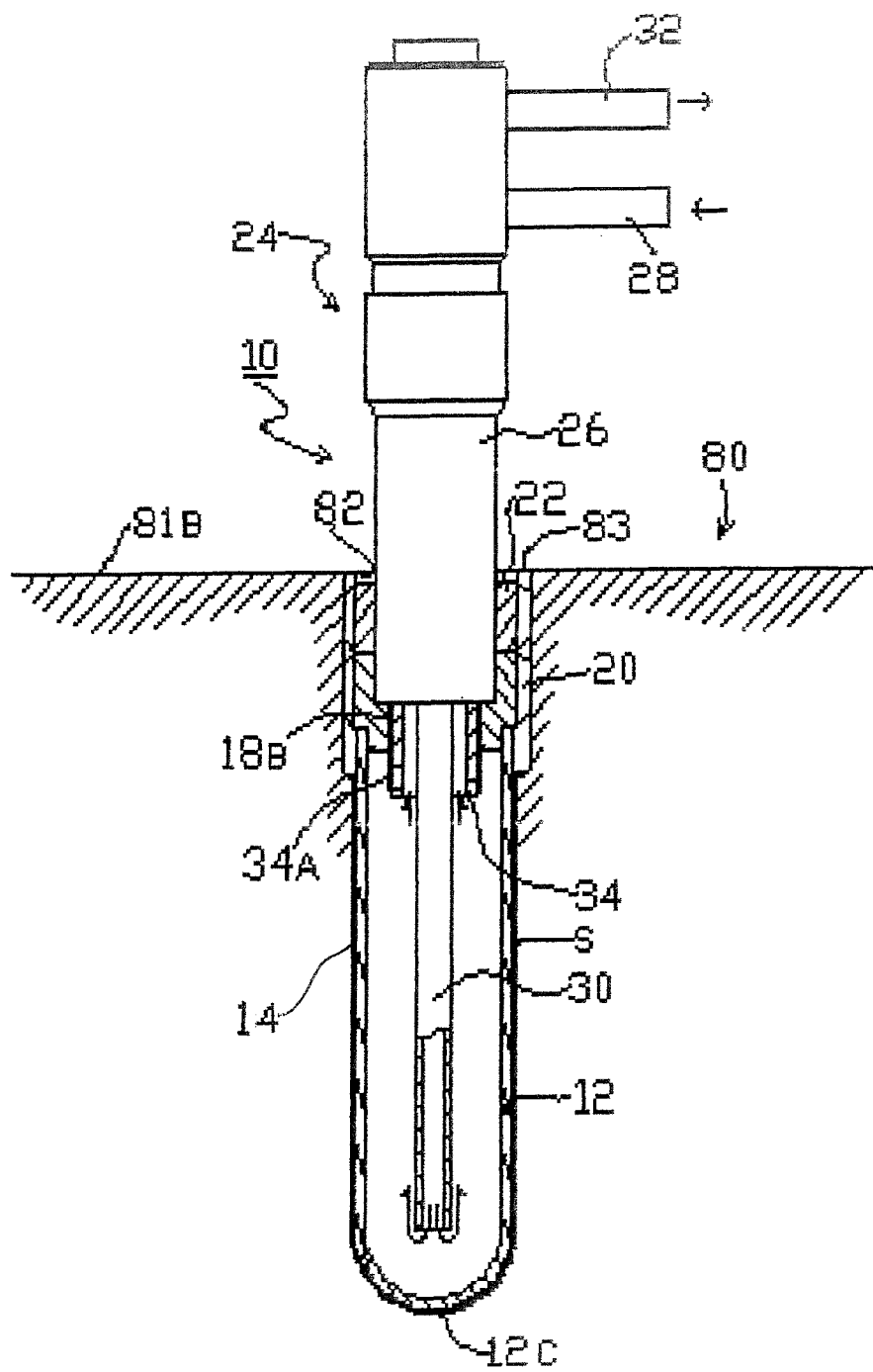
FIG. 1 is a schematic view showing a sealing structure for cooling a metallic mold die according to a first embodiment of the invention.

In the following description of the depicted embodiments to carry out the invention, described are a filling material, a sealing structure and a method of making the sealing structure.

Referring to FIGS. 1 through 5 which shows a cooling-type bushing tool 12 (referred to as "bushing tool 12" hereinafter) according to a first embodiment of the invention. The bushing tool 12 has a filling material S which serves as a mixture made from a liquid epoxy resin, a powdered metal and a hardening agent in which said epoxy resin is hardened by the hardening agent. Otherwise, the epoxy resin is hardened and charred by means of a heat treatment after hardened.

The epoxy resin categorically represents aromatic epoxy resin, aliphatic epoxy resin, alicyclic epoxy resin and the like (referred merely to as "epoxy resin" hereinafter). More specific, bisphenol A type epoxy resin or bisphenol AD type epoxy resin is preferable, and more preferable is bisphenol F type epoxy resin with a lower viscosity.

The epoxy resin has a harden-shrinkage ratio lower than that of metals (zinc, tin, lead or the like) which has low melting points, and having an adherence force stronger than a polyester resin. The harden-shrinkage ratio (solidification ratio) of the epoxy resin is 0.1%, while the metals (e.g., soldering metals) having low melting points are around 1-2%. The adherence force of the epoxy resin is 20 mPa-40 mPa and the adherence force of the polyurethane and the polyester resin are 10 mPa-20 mPa. Namely, the epoxy resin has the adherence force approximately twice as strong as that of the polyurethane.

The epoxy resin, according to the present invention, the filling material has the epoxy resin as a main ingredient and having powdered metal in addition to a liquid or powdered hardening agent. The epoxy resin is used to act as a binder for the powdered metals. The powdered metals are represented by stainless steel, iron, copper or zinc. Among the powdered metals, zinc is preferable as an anti-rust agent, and copper is preferable as a high heat-conductivity agent.

In general, zinc is ionized and oxidated earlier than iron to form an anti-rust film which prevents zinc from being eroded. From the ionized point of view, the powdered zinc has the anti-rust effect for copper and iron and having a heat-conductivity higher than iron and stainless steel. As for the powdered zinc which is oxidizable and combustible, it is necessary to isolate the powdered zinc from oxygen in the atmosphere. For this purpose, the powdered zinc is mixed within the epoxy resin to coat the surface of the powdered zinc with the epoxy resin. It is to be noted that a hardening agent may be added to the epoxy resin while mixing the powdered zinc with the epoxy resin.

Since the thermo-grease has approx. 8.2 W/m·K at heat-conductivity, it is preferable to use stainless steel (24 W/m·K), iron (84 W/m·K), zinc (383 W/m·K) and copper (403 W/m·K), each of which has the heat-conductivity higher than the thermo-grease. As for the weight percentage of the powdered metal and the epoxy resin, it is preferable that the powdered metal contains more than 85-95% by weight and that the epoxy resin contains less than 15-5%.

The powdered metal contains a grain size greater than 1 μm in diameter. When applied to a metallic mold die 80 as described hereinafter in detail, it is preferable to render the powdered metals to have the grain size more than e.g., 4 μm-100 μm in diameter, considering a size of the clearance (e.g, 0.1-0.5 mm in width) between the bushing tool 12 and a cooling hole 82 (insert hole). More preferably, the powdered metals have the grain size of 4 μm-50 μm in diameter. It is possible to mix the powdered metal having two types of grain sizes (e.g., 40 μm and 4 μm).

In this situation, the grains (4 μm) fill up the intergranular space of the grain size (40 μm). The powdered metal may be one selected from powdered stainless steel, powdered iron, powdered copper or powdered zinc. Otherwise, the powdered metal may be a powdery mixture compound appropriately combined among the powdered stainless steel, powdered iron, powdered copper and powdered zinc.

It is preferable to render the hardening agent to have de-natured polyamine such as, for example, de-natured polyamide-amine, de-nature aliphatic polyamine and de-nature alicyclic polyamine. The liquid de-natured polyamine renders the epoxy resin to have a lower viscosity and harden the epoxy resin under the normal temperature.

As a mixing ratio of hardening agent (e.g., de-natured polyamine), it is preferable that the hardening agent may have 3-10% by weight against the filling material S and the powdered metal. The hardening process advances against the epoxy resin by reacting the active hydrogen to the epoxy base to form secondary amine which reacts to the epoxy base.

In order to render the hardening agent to the bridged polymer, it is necessary for the hardening agent to have more than three active hydrogen atoms and three amino bases in a single molecule. Namely, the epoxy resin has one compound having two or more epoxy bases and another compound (polyamide, polyamine) having two or more active hydrogen atoms (—NH$_2$, —NH, —CONH) which are combined each other to form a stereo-structure (three-dimensional mesh structure) through the addition polymerization reaction. It is to be noted that the polyamine has a hardening speed changing depending on the blending quantity, types of the polyamine and types of the epoxy resin.

The filling material S contains a noncombustible agent for fear that the epoxy resin would not be hardened. As the noncombustible agent, preferably prepared is a phosphorous-based substance or a halogen-based substance. Preferably, the noncombustible agent may have 0.5-1.0% by weight against the epoxy resin and the powdered metal.

The halogen-based substances which contain a toxic compound are represented by bromic-based (e.g., pentabromo-phenylether), fluoro-based and chloric-based substances. The phosphorous-based substances (inorganic noncombustible substances) which contain a non-toxic compound are preferably represented by antimony trioxide, aluminum hydroxide and magnesium hydroxide.

Sealing Structure with the Use of Filling Material

As for a sealing structure used for cooling the metallic mold die 80 and a method of making the sealing structure, the sealing structure is especially employed to a metal die cooling mechanism 10 for the metallic mold die 80.

Figure 2:
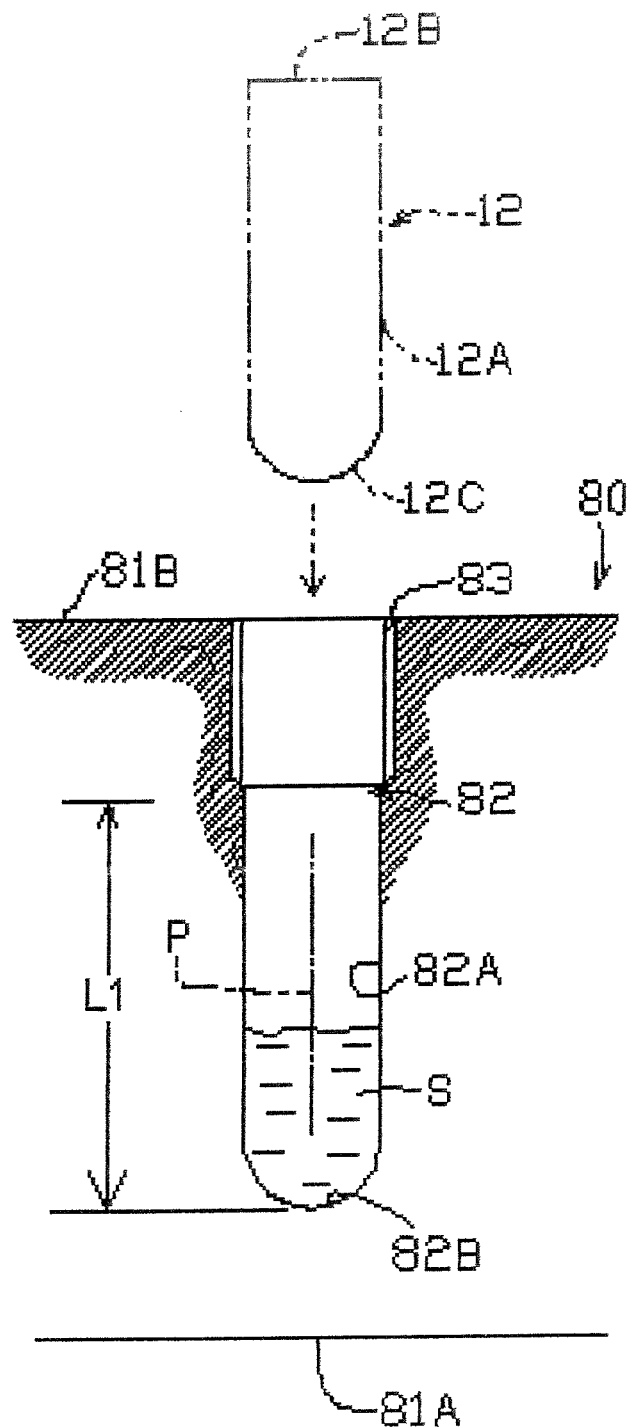
FIG. 2 is a longitudinal cross sectional view showing a cooling hole together with a bushing tool.

As shown in FIGS. 1 and 2, the metallic mold die 80 serves as a device body which means an object to be cooled. The metallic mold die 80 has a cavity surface 81B and the cooling hole 82 (insert hole) provided at an opposite side 81A to the cavity surface 81B, so as to cool the metallic mold die 80.

At an upper side of the cooling hole 82, a female-thread portion 83 is provided. An axial bore 82A is provided consecutively to the female-thread portion 83 to form the cooling hole 82 as a whole. The cooling hole 82 has an inner diameter indentical to an inner diameter of the axial bore 82A. At the bottom of the axial bore 82A (cooling hole 82), a semi-spherical end portion 82B is formed.

Rather than the cooling hole 82 has a bore diameter identical to the outer diameter of the bushing tool 12, the cooling hole 82 has a bore diameter corresponding to the outer diameter of the bushing tool 12. The cooling hole 82 has a bore diameter slightly greater than the outer diameter of the bushing tool 12, so that the bushing tool 12 can be inserted into the cooling hole 82. The cooling hole 82 has an inner surface undulated as tool marks in a concave and convex fashion caused by the boring operation.

Figure 4:
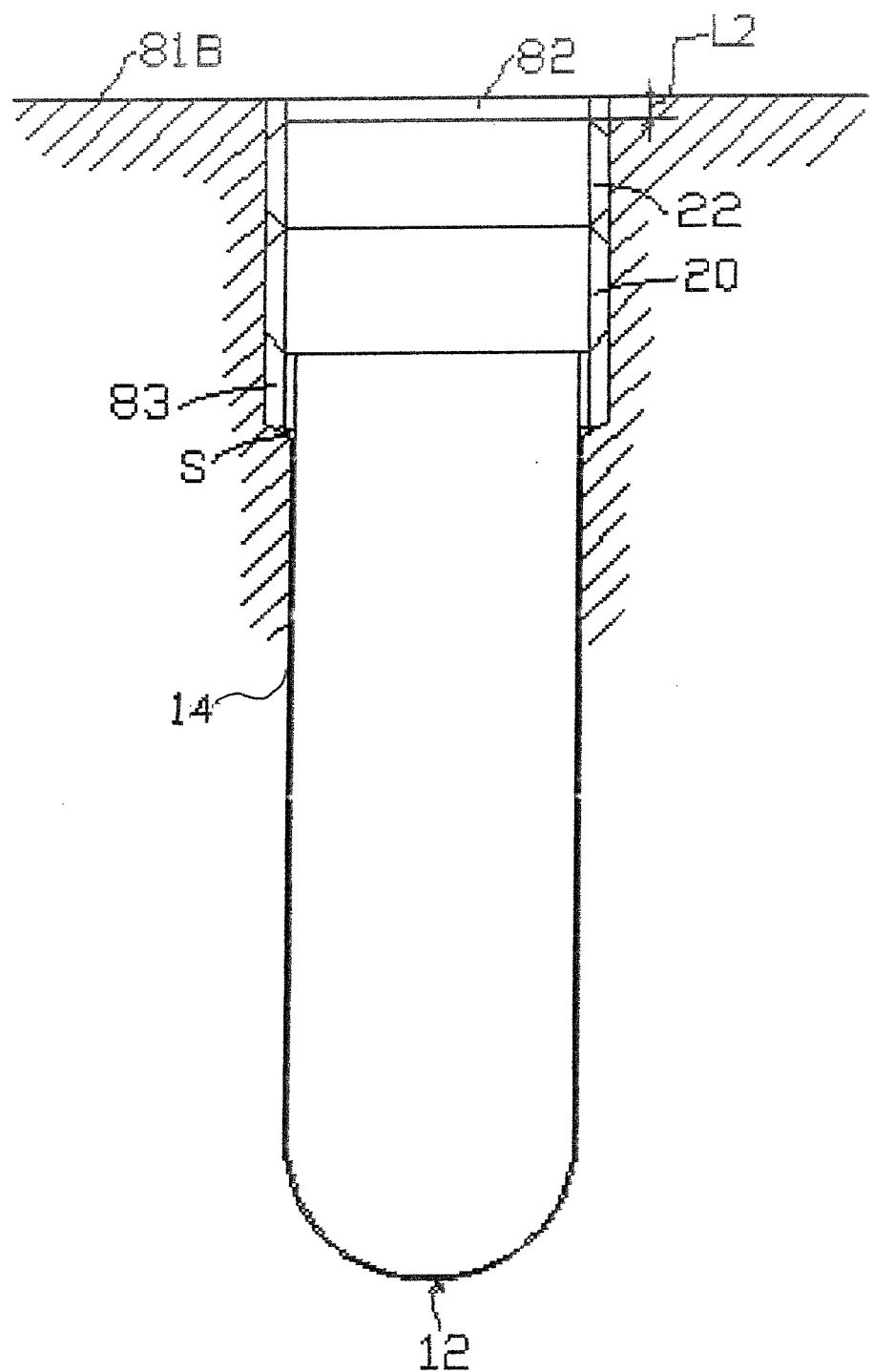
FIG. 4 is a longitudinal cross sectional view showing the bushing tool completely tightened by a predetermined quantity.

By inserting the bushing tool 12 into the cooling hole 82, a clearance 14 is formed between an inner surface of the cooling hole 82 and an outer surface of the bushing tool 12 as shown in FIGS. 1 and 4.

Cooling Mechanism for Metallic Mold Die

As shown in FIG. 1, the metal die cooling mechanism 10 has the bushing tool 12 and a lock nut 22, the latter of which positively places the bushing tool 12 in position within the cooling hole 82. A coupler pipe 24 is connected to the bushing tool 12. The bushing tool 12 together with the coupler pipe 24 partly forms a water-communication passage (equivalent to a cooling circuit) which continuously flows and drains the cooling refrigerant.

Structure for Bushing Tool

Figure 3:
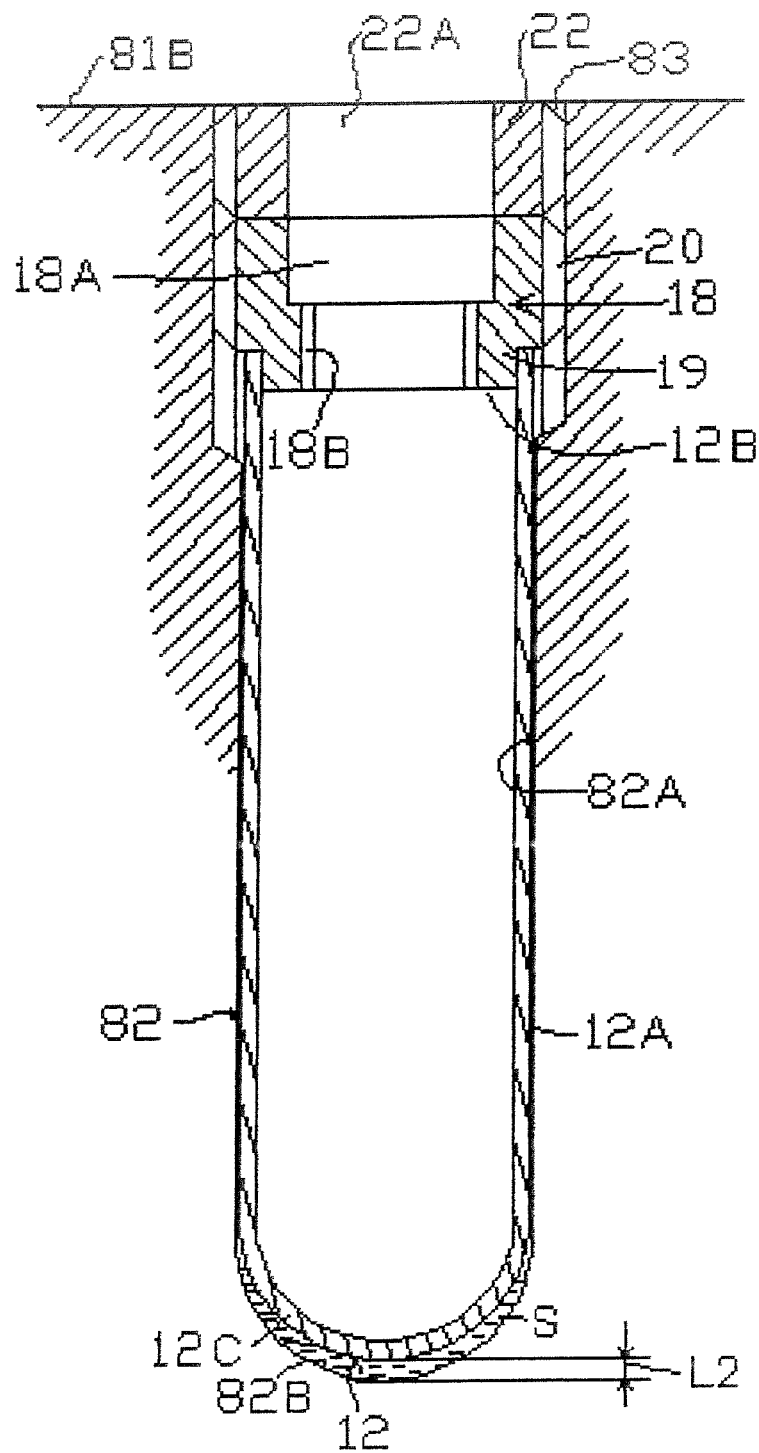
FIG. 3 is a longitudinal cross sectional view showing the bushing tool provisionally tightened by a lock nut.

As shown in FIGS. 1 through 4, the bushing tool 12 has an outer shape corresponding to that of the cooling hole 82. Upon inserting the bushing tool 12 completely into the cooling hole 82, the bushing tool 12 forms a cylindrical configuration having a bottomed portion (bottom-ended portion), an axial line of which aligns along an axial line P of the cooling hole 82 as shown at dot-dash lines in FIG. 2. The bushing tool 12 has a straight portion 12A and an open-ended portion 12B, the latter of which is formed on an upper end of the bushing tool 12 as shown in FIGS. 2 and 3.

As shown in FIG. 2, the bushing tool 12 has a bottomed end having a semi-spherical end portion 12C corresponding to the semi-spherical end portion 82B of the cooling hole 82 as shown in FIG. 4. The bushing tool 12 has a length dimension L1 which is somewhat greater than a total length of the cooling hole 82A and the semi-spherical end portion 82B as shown at phantom line in FIG. 2.

As shown in FIG. 3, the bushing tool 12 has a flange portion 18 removably mounted on the open-ended portion 12B. In this instance, the flange portion 18 of the bushing tool 12 is mounted on the open-ended portion 12B by way of an obturator member (e.g., threaded collar but not shown). The flange portion 18 may be fixedly bonded to the bushing tool 12 by means of a welding procedure (e.g., soldering procedure).

As also shown in FIG. 3, the flange portion 18 has an insert portion 19 and a circumferential portion, around which a male-threaded portion 20 is provided to be diametrically greater than the insert portion 19. The flange portion 18 makes its male-threaded portion 20 mesh with the female-threaded portion 83 of the cooling hole 82. The insert portion 19 is somewhat smaller in diametrical dimension, so that the flange portion 18 can be mounted to the bushing tool 12.

The flange portion 18 has a hexagonal wrench hole 18A, to which the Allen wrench (a.k.a. a hexagonal wrench, but not shown) is applied. The wrench hole 18A lies in registration with the male-threaded portion 20. Below the wrench hole 18A, the flange portion 18 has a female-threaded portion 18B to be in communication with the wrench hole 18A.

The female-threaded portion 18B is adapted to mesh with a male-threaded portion 34A which is provided on an outer surface of the coupler pipe 24 as shown in FIG. 1.

The bushing tool 12 is integrally formed by a high-tension steel metal sheet such as, for example, a mild steel metal by means of the pressing procedure. It is noted that the bushing tool 12 16 may be formed by means of a boring procedure or swaging procedure, in lieu of the pressing procedure.

Structure for Lock Nut

A lock nut 22 is provided to mesh with the female-threaded portion 83 of the cooling hole 82, so as to prevent the male-threaded portion 20 from being inadvertently loosened. The lock nut 22 has a hexagonal wrench hole 22A formed similar to the wrench hole 18A of the flange portion 18.

For this reason, it is possible to concurrently secure the lock nut 22 and the bushing tool 12 by putting the hexagonal wrench into the wrench holes 18A, 22A at the same time.

Structure for Coupler Pipe

As shown in FIG. 1, the coupler pipe 24 serves as a water-communicating means, and having a supply connector 28 which continuously supplies the cooling refrigerant (e. g., water) to the bushing tool 12. Connected to the supply connector 28 is a supply pipe 30.

A drainage connector 32 is to guide the heat-exchanged drain water toward an exhaust basin (not shown). Connected to the drainage connector 32 is a watershoot pipe 34. To the supply connector 28, a water-communicating pipe (not shown) is connected which comes from a water source (e. g., faucet of waterworks). The coupler pipe 24 extends the supply pipe 30 to a proximity of a semi-spherical bottom end portion 16C of the bushing tool 12 as shown in FIG. 1.

Into the wrench holes 18A, 22A, a columnar support pipe 26 is inserted to be held upright as shown in FIG. 1. The watershoot pipe 34 which is located under the support pipe 26, is diameter-reduced more than the support pipe 26.

To an outer surface of the watershoot pipe 34, a male thread portion 34A is formed. The support pipe 26 is formed into a circular cylinder, so that the support pipe 26 is inserted into and extended through the wrench holes 18A, 22A.

Method of Making Sealing Structure

As for the method of making the sealing structure for cooling the metallic mold die (method of assembling the sealing structure in concrete terms). In this method, a filling step is provided to supply the filling material S into the cooling hole 82 (refer to FIG. 2). An inserting step is provided to insert the bushing tool 12 into the cooling hole 82 (refer to FIG. 3). A pushing step is further provided to bring the bushing tool 12 into tight-fitting engagement with an inner wall (i.e., inner surface) of the cooling hole 82 through the filling material S upon inserting the bushing tool 12 into the cooling hole 82 (refer to FIG. 4). Thereafter, the coupler pipe 24 is attached to the bushing tool 12.

Filling Step

In the filling step, a predeterminately calculated quantity (e.g., 35 gram) of the filling material S is supplied to the cooling hole 82. The calculated quantity of the filling material S is such that the filling material S reaches near an uppermost end of the female-thread portion 83 when the bushing tool 12 is pushed into the cooling hole 82.

The filling material S is liquid under the normal temperature which makes it possible to handle the filling material S with ease at the filling operation. Namely, the filling step can be done with a simplified procedure only to flow the filling material S into the cooling hole 82.

Inserting Step

At the inserting step, the bushing tool 12 is inserted into the cooling hole 82 as shown at the phantom line in FIG. 2. At this time, the clearance is established as a sealing space (approx. 0.1 mm-0.5 mm in width) between the inner surface of the cooling hole 82 and the outer surface of the bushing tool 12 as shown in FIG. 3. The filling material S moves upward while pushing up air voids. Before or after inserting the bushing tool 12, the flange portion 18 is mounted on the bushing tool 12.

With the use of the hexagonal wrench or the like, the male-threaded portion 20 is secured to the female-threaded portion 83. The lock nut 22 is further tightened to the bushing tool 12 until the lock nut 22 comes its upper surface to be in flush with the cavity surface 81B of the metallic mold die 80.

In this situation, a remnant space (distance L2) is established between a lowermost end of the semi-spherical end portion 12C of the bushing tool 12 and a lowermost end of the semi-spherical end portion 82B of the cooling hole 82.

At the time of establishing the remnant space, the filling material S pushes the air voids in the proximity of the female-threaded portion 83 of the cooling hole 82. Since the powdered metals mixed with the filling material S has the grain size of 4 μm-50 μm which is smaller than the clearance between the bushing tool 12 and the cooling hole 82, it is possible for the powdered metal to flow through the clearance.

Pushing Step

At the pushing step (tight-fitting engagement step), the bushing tool 12 is pushed deeper into the cooling hole 82 by the predetermined quantity (corresponding to the distance L2). The lock nut 22 moves lower than the cavity surface 81B by the amount of the distance L2 so as to completely attach the bushing tool 12 to the metallic mold die 80.

Under the ambient temperature (approx. 15° C.-40° C.), the epoxy resin in the filling material S is hardened if set for approx. 2-24 hours. Although it is possible to harden the epoxy resin at less than 15° C. if taken a longer time, it is preferable to keep the epoxy resin under the ambient temperature (approx. 15° C.-40° C.) as far as possible. After hardening the epoxy resin, the filling material S is solidified within the sealing clearance between the bushing tool 12 and the cooling hole 82.

Such is the structure that it is needless to determine the clearance (e.g., 0.1 mm-0.5 mm) to be e.g., 0.01 mm-0.09 mm which is more precise than the former clearance. Namely, the filling material S is liquid so that the filling material S fills the clearance in accordance with the shape of the clearance. This permits a latitude in precision errors against the bushing tool 12 and the cooling hole 82, thereby rendering it easy to maintain and control the products with a high assembling efficiency.

According to the sealing structure, the filling material S is provided so that the bushing tool 12 pushes up the filling material S (i.e., deaeration) to fill up the clearance between the bushing tool 12 and the cooling hole 82, thereby preventing the air voids from occurring in the filling material S so as to enhance the heat-conductivity therebetween.

With the powdered metals mixed with the hardened or charred epoxy resin, it is possible to completely plug the the annular clearance between the bushing tool 12 and the cooling hole 82.

This makes it possible to separate the bushing tool 12 from the inner surface of the cooling hole 82. This means to make the bushing tool 12 in contact with the inner surface of the cooling hole 82 by way of the the powdered metal mixed with the hardened or charred epoxy resin. This makes it possible to prevent the cooling refrigerant from leaking to the cooling hole 82, thereby enhancing the heat-conductivity therebetween so as to readily adjust the temperature of the metallic mold die 80.

Heat Treatment Step

After the end of the pushing step, a heat treating step is provided to heat the metallic mold die 80 so as to char the hardened epoxy resin. The heat treating step is done when the bushing tool 12 is in the state as shown in FIG. 3 or 4. The metallic mold die 80 is risen at its temperature (appox. 500° C. -600° C.) to char the epoxy resin.

When heated to approx. 300° C., the epoxy resin releases gaseous components (oxygen, hydrogen or the like) outside from their intermolecular space, and the carbon component is concurrently burned. Considering that the metallic mold die 80 is heated during process in which metallic mold die 80 casts the products, the heat treating step may be provided depending on necessity.

Although the epoxy resin is liable to burn at 200° C., the hardened epoxy resin remains unburned until it reaches more than 200° C. The epoxy resin mixed with the powdered metal to serve as the binder, burns to be charred at the heat treatment step.

This permits the powdered metal (copper or zinc powder) to plug the clearance to deposit on an entire region of the inner surface of the cooling hole 82 and the outer surface of the bushing tool 12, thereby enhancing the heat-conductivity therebetween so as to readily adjust the temperature of the metallic mold die 80.

Temperature-rise Experimental Test Result

Figure 5:
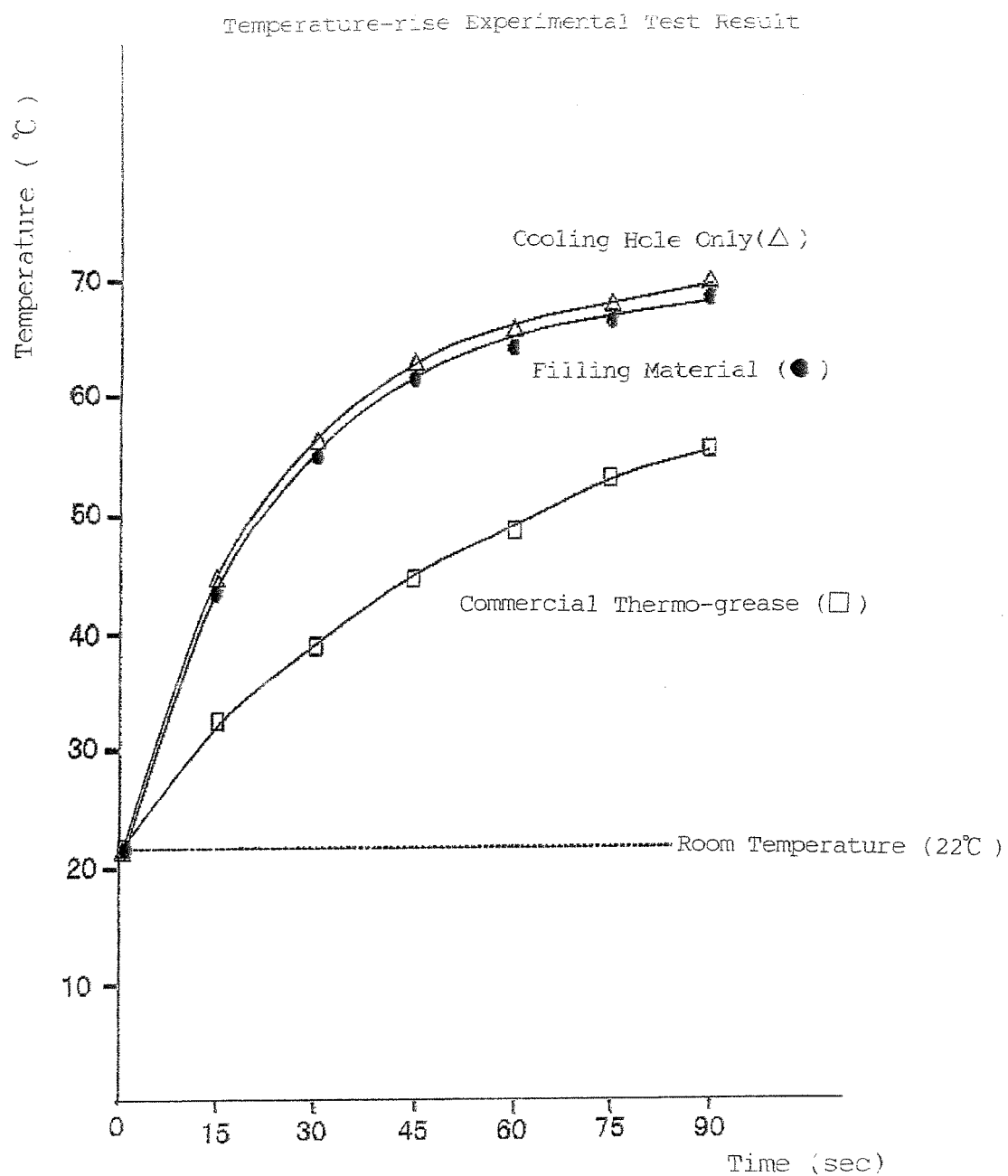
FIG. 5 is a graphical representation showing a relationship between passage of time and temperature rise.

FIG. 5 shows an experimental test result obtained regarding the heat-conductivity of the filling material S. The temperature-rise experimental test was conducted with a heat sensor (not shown) placed in the cooling hole 82 (semi-spherical end portion 82B) and bushing tool 12 (semi-spherical end portion 12C). In the graphical representation in FIG. 5, depicted is a relationship between the temperature rise and the passage of time. The heat treatment step provides a heat-transmission route from the cooling refrigerant (water) toward the heat sensor and the filling material S through the bushing tool 12.

When only the cooling hole 82 is provided devoid of both the bushing tool 12 and the filling material S, a maximum heat-conductivity is obtained as observed at a triangular denotation △. When using the commercial thermo-grease and the bushing tool 12 made of the stainless steel, the conventional heat-conductivity is obtained as observed at a square denotation □. When providing the bushing tool 12 and the filling material S in addition to the cooling hole 82, an enhanced heat-conductivity is obtained as observed at a circular denotation ●. Comparing the detonation ● with other counterparts, the heat-conductivity approaches near the maximum value when using the filling material S than when using the commercial thermo-grease.

With the filling material S separating the bushing tool 12 from the inner wall of the cooling hole 82, it is possible for the filling material S to prevent the bushing tool 12 from being directly in contact with the inner wall of the cooling hole 82. This makes it possible to avoid the cooling refrigerant from leaking off the bushing tool 12 to the cooling hole 82 even when the die cracks occur on the metallic mold die 80.

After assembling the bushing tool 12, the coupler pipe 24 is installed to the bushing tool 12 at a water-communicating step, so as to finish the assemble of the metal die cooling mechanism 10 for the metallic mold die 80.

The coupler pipe 24 is installed by inserting the supply pipe 30 into the cooling hole 82 and setting the support pipe 26 into the wrench holes 18A, 22A as shown in FIG. 3.

Thereafter, the coupler pipe 24 bring the male-threaded portion 34A with the female-threaded portion 18B of the bushing tool 12. With the male-threaded portion 34A meshed with the female-threaded portion 18B, it is possible to prevent the water-leakage from the support pipe 26.

In order to complete a water-communicating conduit, the supply connector 28 is attached to the spigot of the waterworks (not shown) through a communication pipe (not shown), and the drainage connector 32 is led to a catchment basin through a communication pipe (not shown).

The tapwater from the waterworks is continuously supplied to the bushing tool 12 through the supply connector 28 and the supply pipe 30, and drained to the catchment basin through the watershoot pipe 34 and the drainage connector 32 as shown at arrows in FIG. 1.

During the process in which the tapwater is supplied as the cooling refrigerant to the bushing tool 12, the tapwater cools the metallic mold die 80 through the bushing tool 12 when the molten-metal is supplied to a cavity of the metallic mold die 80. The refrigerant water which is heat exchanged with the metallic mold die 80 is drained outside through the watershoot pipe 34.

Although the powdered metal mixed with the charred epoxy resin remains between the bushing tool 12 and the cooling hole 82, it is possible to wash away the powdered metal with the use of a wire brush or the like at the time when rectifying strains occurred in the metallic die mold 80.

This makes it possible to readily remove the powdered metal from the clearance, so as to user-friendly mitigate the laboring force especially when exchanging the bushing tool 12, in contrast to the prior art structure in which the molten metal is placed between the bushing tool and the molten-metal cooling pin.

The device body also includes a central processing unit (CPU) of a super computer, a capacity of which is such as to require one floor of a building to accommodate. Namely, the bushing tool 12 is applicable to the central processing unit (CPU) which serves as the device body.

In the meanwhile, the bushing tool 12 is also employed not only to cool the device body but also to pre-heat the device body. By way of example, a certain quantity of hot water (e.g., 100° C.) may be circulated within the bushing tool 12 after starting to use the metallic mold die 80 or after the metallic mold die 80 is exchanged.

The metallic mold die 80 categorically includes a molten-metal cooling pin (equivalent to the prior art outer cylinder) which comes in direct contact with the molten metal.

The cooling pin has a cooling path and constitutes a part of the metal die when used to the die-casting procedure. The bushing tool 12 may be inserted into the cooling path of the cooling pin.

The metallic mold die includes a molten-metal supplying device placed on a stationary side of the metallic mold die and a sub-flowing device placed on a movable side of the metallic mold die. Namely, the bushing tool 12 may be inserted into a cooling passage provided on the metallic mold die or the sub-flowing device.

Figure 6:
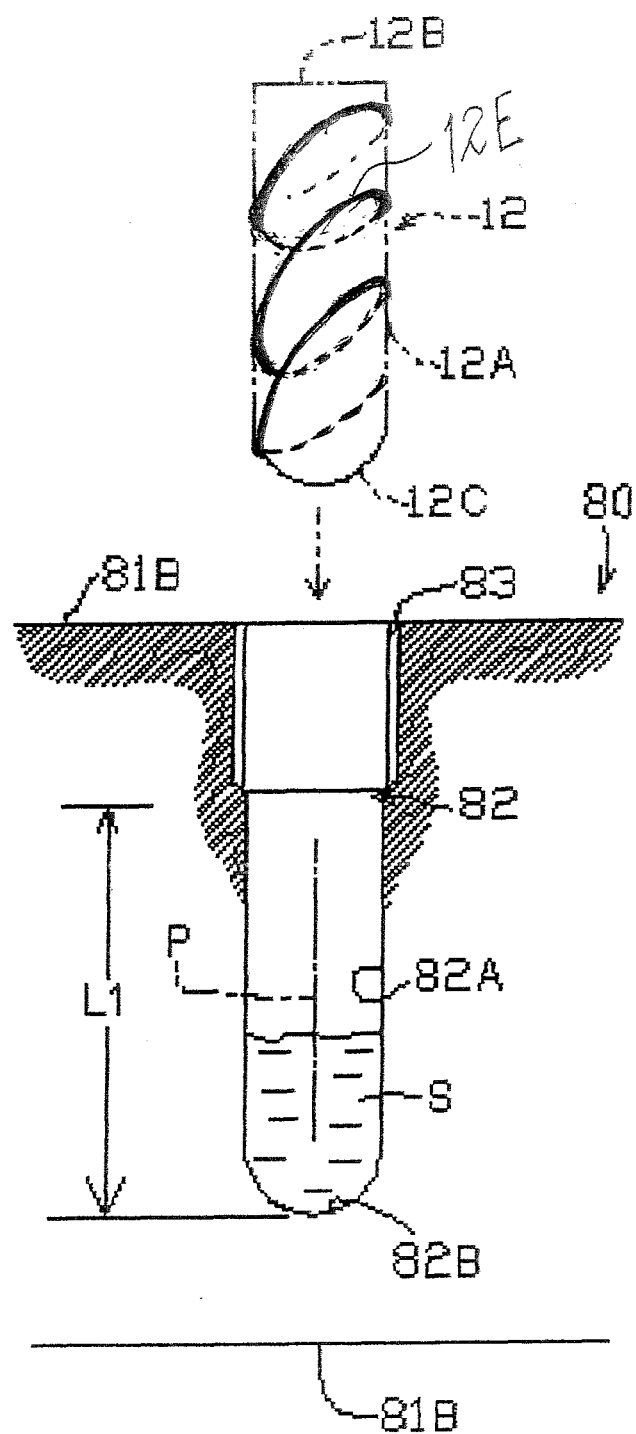
FIG. 6 is a longitudinal cross sectional view showing the cooling hole together with the bushing tool according to a second embodiment of the invention.

FIG. 6 shows a second embodiment of the invention inwhich a ultra-thin metallic wire 12E wound about the outer surface of the bushing tool 12 at a predetermined pitch in a spiral thread fashion. When the bushing tool 12 is inserted into the cooling hole 82, the metallic wire 12E acts as a spacer to hold the annular clearance (sealing space) uniform between the outer surface of the tool 12 and the inner surface of the cooling hole 82.

Such is the structure that it is possible to equally transfer the cooling heat from the bushing tool 12 to the metallic mold die 80 through the filling material S. Upon hardening the epoxy resin, the metallic wire 12E comes in integral with the epoxy resin, while the metallic wire 12E comes in integral with the charred epoxy resin upon heat treating the epoxy resin. This makes it possible for the metallic wire 12E to contribute to the heat-conductivity between the bushing tool 12 and the metallic mold die 80.

It is to be noted that metallic sire 12E may be made of gold, silver, steel copper, aluminum, stainless steel or felt.

Modification Forms

When the bushing tool 12 is completely installed within the cooling hole 82 (at the completely tightened position), the lock nut 22 may be in flush with the cavity surface 81B of the metallic mold die 80. The male-threaded portion 20 may be provisionally welded to the female-threaded portion 83 to prevent the male-threaded portion from being inadvertently loosened. Instead of the bushing tool 12, a pin, a sleeve or a casing may be employed as the inserting member.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

What is claimed is:

1. A method of making a sealing structure for a filling material in which said filling material is provided on a device body having an insert hole, a bottom portion of which has a semi-spherical end portion, said device body further having a bushing tool in a cylindrical configuration to form a sealing space between an outer surface of said bushing tool and an inner surface of said insert hole, said filling material having a liquid epoxy resin, a powdered metal and a hardening agent in which said epoxy resin is hardened by said hardening agent, or said epoxy resin is hardened by said hardening agent and concurrently said epoxy resin being charred by a heat treatment after hardened;

said method comprising steps of:
providing said filling material into said insert hole;
inserting said bushing tool into said insert hole, said bushing tool having an outer diameter corresponding to an inner diameter of said insert hole, and having a leading end which has a semi-spherical end portion corresponding to said semi-spherical end portion of said insert hole;
pushing said bushing tool into said insert hole by a predetermined amount as a tight-fitting engagement procedure and hardening said epoxy resin to tightly provide said epoxy resin at said sealing space between said bushing tool and said insert hole; and
further heat treating said device body, so that said filling material is solidified at said sealing space to produce said powdered metal with said epoxy resin charred with said powdered metal isolated from oxygen in the atmosphere.

2. The method of making the sealing structure for the filling material method according to claim 1, wherein said hardening agent is de-natured polyamine.

3. The method of making the sealing structure for the filling material method according to claim 1, wherein an noncombustible agent is contained.

4. The method of making the sealing structure for the filling material method according to claim 1, wherein said noncombustible agent is a phosphorous-based substance or a halogen-based substance.

5. The method of making the sealing structure for the filling material method according to claim 1, wherein said powdered metal has grains, size of which is more than 1 μm in diameter.

* * * * *